(12) United States Patent
Mooring, II et al.

(10) Patent No.: US 9,972,003 B2
(45) Date of Patent: May 15, 2018

(54) PREGAME ELECTRONIC COMMERCE INTEGRATOR

(76) Inventors: Melvin B. Mooring, II, Kennesaw, GA (US); Edward R. Mooring, Jr., Bowie, MD (US); Jason Lyles, Mitchelville, MD (US)

( * ) Notice: Subject to any disclaimer, the term of this patent is extended or adjusted under 35 U.S.C. 154(b) by 0 days. days.

(21) Appl. No.: 13/489,935

(22) Filed: Jun. 6, 2012

(65) Prior Publication Data
US 2013/0332294 A1 Dec. 12, 2013

(51) Int. Cl.
*G06Q 20/32* (2012.01)
*G06Q 20/20* (2012.01)
*G06Q 30/06* (2012.01)

(52) U.S. Cl.
CPC .................. *G06Q 20/322* (2013.01)

(58) Field of Classification Search
USPC .............................. 705/15, 30, 14.27, 16, 21
See application file for complete search history.

(56) References Cited

U.S. PATENT DOCUMENTS

| | | | | | |
|---|---|---|---|---|---|
| 8,498,900 | B1* | 7/2013 | Spirin | .................... | G06Q 50/00 340/286.09 |
| 2004/0030601 | A1* | 2/2004 | Pond | ..................... | B67D 7/145 705/16 |
| 2009/0037286 | A1* | 2/2009 | Foster | .................... | G06Q 20/20 705/21 |
| 2009/0055269 | A1* | 2/2009 | Baron | .................... | G06Q 20/40 705/14.14 |
| 2011/0173060 | A1* | 7/2011 | Gallagher | .......... | G06Q 20/0425 705/14.27 |
| 2011/0270662 | A1* | 11/2011 | Rocco | .................... | G06Q 30/02 705/14.27 |
| 2012/0012653 | A1* | 1/2012 | Johnson | ................. | G06Q 20/12 235/380 |
| 2012/0296751 | A1* | 11/2012 | Napper | ................ | G06Q 20/208 705/23 |
| 2013/0232017 | A1* | 9/2013 | Nathanel | ................ | G06Q 20/20 705/16 |

* cited by examiner

*Primary Examiner* — Scott A Zare
*Assistant Examiner* — Reva R Danzig
(74) *Attorney, Agent, or Firm* — John L Sotomayor

(57) ABSTRACT

The PreGame payment system is provided to optimize throughput capacity for retail establishment, such as restaurants, bars, grocery stores, or the like, by providing a secure and speedy method of accumulating and paying expenses on a tab maintained with the retail establishment. The PreGame system provides the everyday patron the opportunity to open, track, and close their own tabs with each retailer via their handheld or mobile device, eliminating any physical monetary exchanges or credit card exchanges between the retail staff person and the patron.

16 Claims, 3 Drawing Sheets

PREGAME ELECTRONIC COMMERCE INTEGRATOR

1 FIELD OF THE INVENTION

Figure 1:
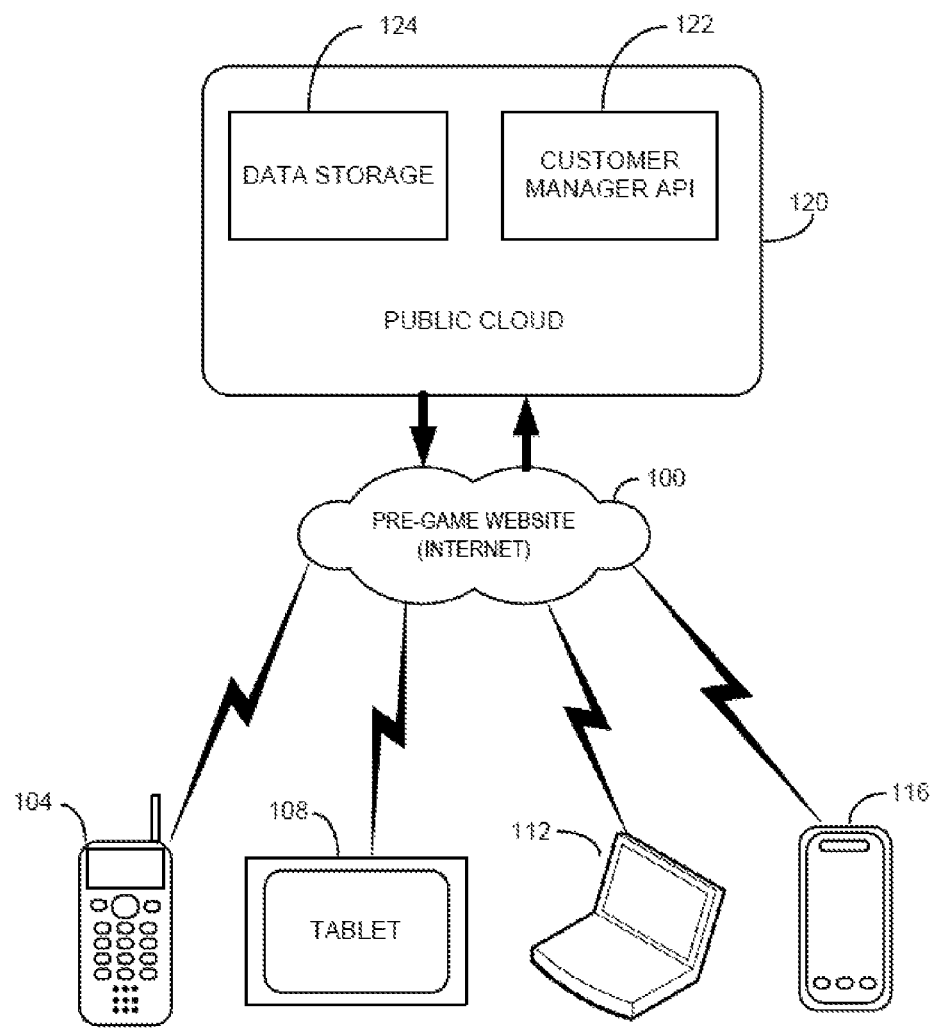

The present invention generally relates to a system for integrating with Point of Sale (POS) systems in restaurants and other retail establishments to accommodate electronic commerce. The integration occurs between a handheld, mobile device and POS systems whereby the user of the mobile device interacts with the POS of the retail establishment through a wireless connection.

2 BACKGROUND OF THE INVENTION

Electronic commerce is facilitated by applications available on handheld or mobile devices. Such applications may be integrated with Point of Sale (POS) systems installed and used in retail establishments such as bars, restaurants, retail stores, and other public venues where products and services are offered for sale. In bars and restaurants it is a common and well-known action to open a tab with the restaurant or bar upon which charges for requested food, drink, or services may be accumulated and presented for payment at the termination of the users stay in the retail establishment.

Payment systems that can integrate with a POS in a restaurant exist in the stream of commerce. For example, U.S. Patent Application No. 2011/0191196 provides a description of a mobile application that provides a method to pay a restaurant and/or bar bill. However, this process is confined to a mobile application and is too tightly coupled with POS providers who will allow the mobile application to integrate with the POS. The mobile application described must be configured to operate with the existing software within a smartphone. Only Guest Experience smartphone users can use this mobile application.

The Square iPhone and Android application allows any business to accept credit card payments with an attachment for the mobile device with WiFi and/or 3G-4G connections. This application requires a strong Internet connection and does not integrate well with existing POS solutions. Restaurants and other businesses must use and be registered with Square for customers to pay using the Square payment application. This payment solution actually takes the place of the retail vender's POS system rather than integrating with the vender's POS system.

RAIL by ViableWare is a payment option for restaurants to allow patrons to pay at the table without intercession by the wait staff. ViableWare provides hardware that integrates with the restaurant's existing POS system and provides the opportunity for customers to pay with provided tablets that can accept credit cards, 2d barcodes, gift cards and other forms of payment. The tablets are linked to the existing POS system and RAIL hardware using a wireless router. In this solution, security and functionality are only as strong as the restaurant's wireless connection. Patrons can pay a restaurant bill at the table only with hardware provided by ViableWare and made available at the table by the restaurant.

3 BRIEF DESCRIPTION OF THE INVENTION

The present invention is directed to integrating a mobile payment application with POS systems currently in use in retail establishments. The software application is called PreGame and is compatible with all currently available POS systems in the marketplace. PreGame is a single payment point of service for the quick service restaurant and bar industry, optimizing throughput capacity for such restaurants and bars and increasing the speed of service for customers. A patron may install the PreGame application on any mobile or handheld device such as a cell phone, smartphone, tablet, laptop computer, personal computer or the like and create and manage the payment account associated with the patron. Thus, the everyday patron of such retail shops is given the opportunity to open, track, and close their own expense tabs via the PreGame application, eliminating physical monetary exchanges or credit card exchanges between the bartender or waiter and the patron.

In another embodiment, the PreGame software offers an automatic "tab closeout" feature that will process payment for the expense tab and close out the tab with the retail establishment if there is no purchase or service activity recorded for the patron during a preset time period. In this exemplary embodiment, the preset limit is set to a default of two hours, but may be preset to any time span preferred by the patron. Through the integration of PreGame with the POS system, if the mobile device in use by the patron runs out of power and shuts down the mobile device, the patron has the option of closing an established service tab with the bartender or wait staff.

In additional alternative embodiments, the PreGame application may extend the integration for payment options to other retail markets such as grocery stores and shopping malls where mobile payment could lead to greater efficiency in the shopping experience by cutting down the time a patron must stand in line to offer payment to a retail clerk. PreGame may also provide a payment option for payment of goods and/or services from online sources, making it easy for a shopper to take advantage of online sales that may be unavailable to "in-person" shoppers. The PreGame application may also provide integration with a Quick Response (QR) code to allow an instant input access to particular online retailers or other retailers where the patron wishes to transact purchase activities.

4 BRIEF DESCRIPTION OF THE DRAWINGS

Figure 2:
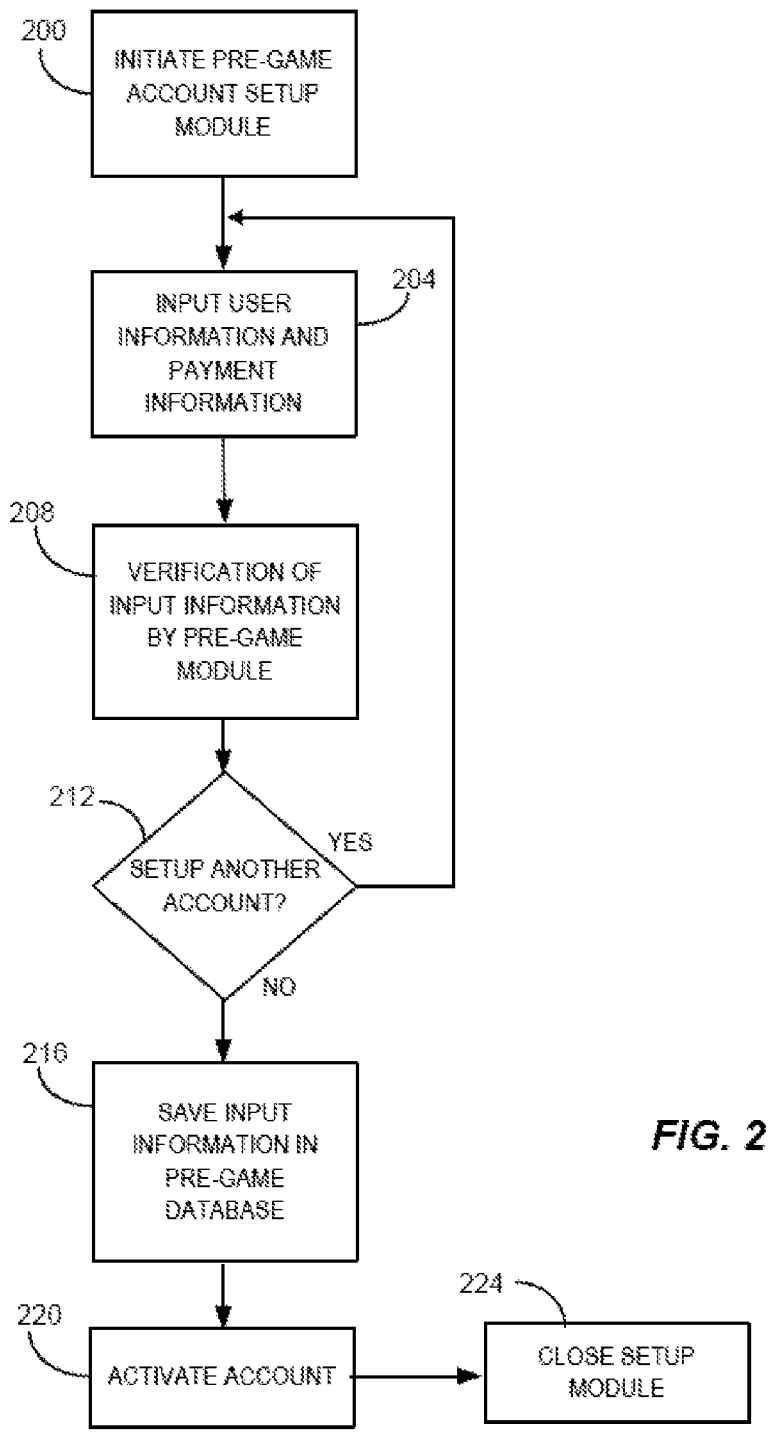
Figure 3:
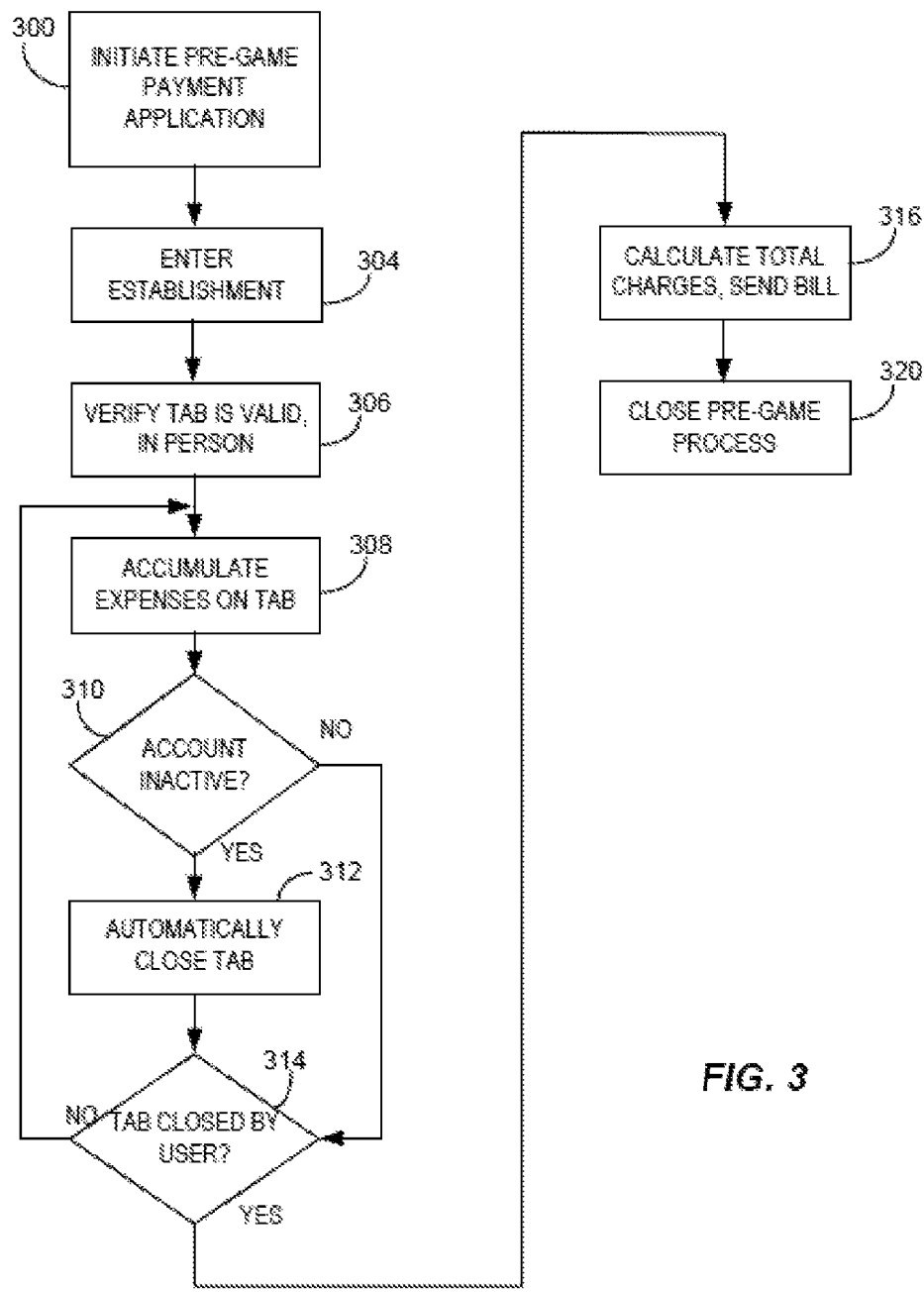

FIG. 1 illustrates an exemplary system for facilitating electronic commerce consistent with certain embodiments of the invention;

FIG. 2 presents a flow diagram for the setup and verification of user accounts consistent with certain embodiments of the invention; and FIG. 3 presents a flow diagram for the operation of the PreGame electronic commerce process consistent with certain embodiments of the invention.

5 DETAILED DESCRIPTION OF THE INVENTION

The present invention relates to a software application that may be installed on one or more handheld or mobile devices that integrates with a POS system in a retail establishment, such as a restaurant, bar, grocery store, or the like, to provide a patron with payment capability for goods and services from the retail establishment. The software application, called the PreGame application, provides the patron with the opportunity to open, track, and close an electronic record that is an open-ended goods and services invoice, such as, in a non-limiting example, a restaurant or bar tab. The electronic record of goods and services is open-ended to permit the inclusion of goods and services added to the electronic record in an ad hoc fashion without requiring a patron to pay immediately for goods and services thus ordered. The open-ended invoice is updated simultaneously in both the PreGame application and the POS system with which the PreGame application is in communication. Goods and services may be ordered by a patron and the staff members of the retail establishment may access the electronic record of the open-ended invoice, which may be referred to in a non-limiting example a "tab", to include all such orders for goods and services authorized by the patron from the retail establishment. The open-ended invoice may be subject to a preset spending or time limitation, such that when the present limit is reached the PreGame application may initiate actions to pay and close out the open-ended invoice. A patron may also, upon notification that the preset spending or time limit has been reached, postpone the payment and closure actions and keep the open-ended invoice, such as a bar tab, open and accepting additional entries prior to a directive from the patron to close out and pay the open-ended invoice. A patron may open more than one open-ended invoice simultaneously with one or more service providers, such as, by way of example and not of limitation, restaurants, bars, grocery stores, hotels, entertainment properties, casinos, and the like. Upon closure of the open-ended invoice, the patron will receive notification via email to the patron's personal email address that the invoice, or in this non-limiting example restaurant or bar tab, has been paid and the payment has been debited from the account that the patron maintains with the PreGame central server.

FIG. 1 presents an exemplary system view for the operation of the PreGame payment system. The PreGame website 100 is the portal for patrons to setup and initialize their accounts and participation in the PreGame payment system. In an exemplary embodiment, prior to visiting a participating retail establishment and instantiating the PreGame payment application a potential patron will be required to set up at least one account on the PreGame website 100. The potential patron must visit the PreGame website 100 through an Internet connection. In this exemplary embodiment, the potential patron may connect to the PreGame website 100 from any devices, such as a cell phone 104, tablet device 108, laptop or other computer 112, smartphone 116, or any other like device capable of connecting and sustaining a wired or wireless network communication channel with the Internet and request that one or more accounts be setup in their name. During the account setup phase the potential patron may input debit or credit card information into the PreGame website 100 for storage in the PreGame system encrypted database. The PreGame encrypted database provides data security for the patron's sensitive card information both during the initial input of such information from the patron and when retrieved on behalf of the patron when processing future payment requests and activities.

Upon completion of the entry of sensitive payment card information, the PreGame application may provide the patron the opportunity to choose one or more retail establishments, such as, in a non-limiting, example restaurants or bars, that is compatible with the PreGame payment system. The PreGame website 100 application may contact the public cloud 120 by accessing a Customer Manager Application Programming Interface (API) 122 that will manage the interaction between the PreGame patron and the public cloud. The PreGame system may maintain one or more databases 124 containing lists of compatible retail establishments that are accessed by the patron through the Customer Manager API 122.

FIG. 2 presents an exemplary flow diagram for the steps required for a patron to setup one or more accounts with the PreGame payment system. The prospective patron may visit the PreGame payment system to initiate account setup with the PreGame payment system at 200. In this exemplary embodiment at 204 the prospective patron may input patron personal information and secure payment information, such as credit or debit card information through the Customer Manager API. The PreGame payment system may then verify the input information as required with, for example, financial institutions, to verify that the input information the patron has presented is valid and that the patron has the ability to setup and maintain accounts with PreGame that will be appropriately settled with regard to successful payment for requested goods and services. At 212, the prospective patron is provided an opportunity to setup additional accounts with different retail establishments that are authorized PreGame venders. In the exemplary embodiment, as part of successful account setup, the patron may be provided with the opportunity to preset or pre-select a self-imposed spending limit. This preset or preselected amount may be tracked by the PreGame website 100 tracking module to enable automatic notification to the patron of instances where the preset or preselected spending limit is about to be reached for that particular account and establishment. The patron may be notified on their mobile device (108, 116) of the imminent breach of the self-imposed spending limit. Although the PreGame system offers this function to patrons, a patron payment request will not be denied because a self-imposed spending limit has been reached or exceeded. This function is intended as a tracking and advisory function only and patrons are free to continue to request payment actions even if such actions do exceed the self-imposed preset spending limit established for the account. After setting or selecting a self-imposed spending limit, the patron must also agree to pay a minimum tip percentage per check if such a tip percentage is required by the establishment as a condition of using the PreGame payment system in their retail establishment. Setting the tip percentage amount per check will require the patron to pay that percentage as designated by the retail establishment should the patron's tab go inactive and become subject to automatic closure, however, the patron is not bound to payment of this tip percentage if the patron proactively closes the tab with the retail establishment prior to the automatic closure of the tab based upon account inactivity for a specific length of time. However, if the patron opens and closes a tab without ordering food, drink or services, the patron will not incur any charge. If the patron chooses to set up another account, the PreGame setup process will again provide the patron with the opportunity to input personal and payment information to the system for use with a different retail establishment, or the patron may simply populate the new account with already input information to setup the next account.

In the exemplary embodiment, at 216 the patron has completed the setup of one or more accounts and has opened at least one tab with one or more retail establishments that are authorize payment through the PreGame payment system. The information input by the patron is stored in one or more databases maintained on the PreGame website server. However, the established tab does not become active to receive items to be paid by the patron on the tab until the patron has personally verified the account. At 220, the personal account verification may be accomplished by the patron through the use of a mobile device with Internet access, through the use of a mobile application, or through the use of the PreGame payment system website 100. At 224, the patron has successfully setup and activated at least one payment account and setup one or more tabs with at least one PreGame registered retail establishments and the PreGame website application may be closed by the patron signing out of the application. It will be understood that a patron may return to the PreGame setup application at any time to manage existing tabs, existing account parameters, or to establish new tabs with additional retail establishments by accessing the PreGame payment system at the PreGame website 100.

FIG. 3 presents an exemplary flow diagram for the operation of the PreGame electronic commerce payment system. In this exemplary embodiment when a patron desires to use the PreGame payment system a patron may initiate the PreGame payment system client on a handheld or mobile device at 300. At 304 to open a tab the patron may preselect the retail establishment prior to entering the retail establishment, or the patron may select the retail establishment upon physical entry. In an alternative embodiment, the patron may scan a QR code associated with the retail establishment, if one is available, and the PreGame payment system may use the input information from the input QR code to select the retail establishment the patron has chosen to enter. At 306 the patron notifies the waiter, bartender, or other staff person that a tab has been opened with the POS associated with the retail establishment. The patron, as part of the validity verification for the tab, presents a valid personal identification card. The staff member may then verify the information for the patron that is stored under the PreGame tab present in the POS used by the retail establishment. In this exemplary embodiment, if a patron is logged into their PreGame account and has opened multiple tabs in different locations, a message is sent from the PreGame system server to the patron's mobile device to inform the patron that tabs are open in multiple retail locations and may inform the patron which tab is active or in use at that moment in time. A second message is also sent to the patron as a push notification to inform the patron regarding any tab closing times or spending limits for each open tab.

At this point the PreGame payment system tab for the patron has been opened and verified and may begin to accumulate expenses on the tab at 308. The patron is now free to order any food, drinks, goods, or services offered by the retail establishment. By way of example and not of limitation, the PreGame payment system provides patrons with the freedom to set spending limits for any tab at any time. The PreGame payment system operates through a Business Rules Engine (BRE) to allow patrons the option to set a spending limit for each tab established for the patron. The spending limit field maintained by the BRE in the PreGame system database may be populated with a default value between $0-$500 when the tab is initiated by the patron. However, the patron may have the option of changing the spending limit to any value desired by the patron. In this exemplary implementation, a spending limit is an alert point, not a cut off limit. A patron is free to decline spending limits for any tabs established with the PreGame payment system and enjoy shopping or entertainment however they choose.

At 310 the PreGame client application may check to determine the active status of the patron in the establishment. By way of example and not of limitation, the PreGame system may provide patrons a configurable parameter that details how long the patron prefers to allow tabs to remain open and accepting expenses. The PreGame payment system may have a preset account inactive period of two hours before initiating an automatic closure of an open tab account with any retail establishment. A patron may elect to change the automatic closure time limit on a tab by tab basis, and may change this patron at any time prior to the initiation of an automatic closure action. In an additional exemplary embodiment, the PreGame system may check the patron's credit authorization whenever the user changes the closing time for any tab. In a non-limiting example, if a patron desired to close tabs after fifteen minutes of activity, the PreGame payment system may send a message ten minutes after activation of the tab for expense acceptance to provide the patron with a warning the tab is about to close to additional expenses. The patron may choose at that time to extend the time limit during which the tab will continue to accept expenses or continue with the preset authorized closing of the tab. Additionally, the tab closure action may be initiated if the tab has been inactive for the preset time limit established by the patron or at the default time limit. At 312 if the tab has been inactive for the established period of time, the system may automatically perform the closing action for the tab.

If the account has not been active for the present time limit and the patron has not indicated that the tab should be closed, the tab will remain open to the addition of expenses to the tab. Alternatively, at 314 if the preset inactive time limit has not been reached, but the patron desires to close the tab the user may initiate closing action for the tab. At 316, when closing action for the tab has been initiated, either through the expiration of the inactive time limit set for the tab or by a request submitted by the patron, the PreGame system software will close the tab to keep additional expenses from being added to the tab after the initiation of closing action. The PreGame system software may then calculate the total of the charges for all expenses accumulated on the tab and compose a final bill for the tab. At 318, the PreGame system software will close the tab and the final bill may then be emailed directly to the patron's email address with the total amount of charges, expenses, and tips, debited from the patron's account maintained by the PreGame system.

6 CONCLUDING REMARKS

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicant's invention set forth in this specification, and neither its use nor its absence is intended to limit the scope of the applicant's invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

We claim:

1. A method of electronic commerce for facilitating electronic payment for ad hoc charges for goods and services with a plurality of point of sale (POS) systems, comprising:
   instantiating a software client installed to open the software client in a handheld computer processor possessed by a retail patron;

establishing a wireless communication channel from the software client on the handheld computer processor with the plurality of POS's systems associated with one or more retail establishments;

simultaneously initiating, in the software client of the handheld computer processor, a plurality of electronic open-ended invoices for the retail patron with the plurality of POS systems for tracking the goods and services provided to the retail patron via the plurality of POS systems;

coordinating communication via the established wireless communication channel from the handheld computer processor of the retail patron with each POS system of the plurality of POS systems to update, modify, and close any of the electronic open-ended invoices;

in response to the simultaneous initiating each of the plurality of open-ended invoices, setting, in the software client, a preset spending or time limitation for each open-ended invoice of the plurality of open-ended invoices;

determining, at the software client, that at least one of the open-ended invoices have exceeded at least one of the preset spending and the time limit;

in response to the determining, selecting the at least one open-ended invoice found to have exceeded the at least one of the preset spending and the time limit from the plurality of open-ended invoices for closure;

closing automatically, at the software client, the at least one selected open-ended invoice while simultaneously the software client remains active to manage all other of the plurality of open-ended invoices associated with the software client; and debiting, at the software client, from an account of the retail patron an amount sufficient to pay the charges for the goods and services associated with the selected open-ended invoice upon the closure of the at least one selected open-ended invoice.

2. The method of claim 1 where the software client is in wireless communication with a website associated with a PreGame electronic commerce payment application.

3. The method of claim 2 where the electronic open-ended invoice is an electronic record associated with a Point of Sale system; and
interactions with the electronic open-ended invoice are communicated to the PreGame electronic commerce payment application.

4. The method of claim 3 where interactions with the at least one selected open-ended invoice include adding charges for goods and services authorized by a patron, modifying the at least one selected open-ended invoice to subtract or change authorized charges, closing the at least one selected open-ended invoice to further authorized or unauthorized charges, and adding services charges where authorized by the patron.

5. The method of claim 2 further comprising calculating the value of goods and services associated with entries on the at least one selected open-ended invoice and providing this amount to the PreGame electronic payment application for payment.

6. The method of claim 1 where the handheld computer processor may be a processor associated with a cell phone, tablet device, laptop computer, smartphone, or other handheld mobile device.

7. The method of claim 1 where the retail establishment is pre-enrolled with a PreGame electronic commerce payment application to accept interactive messages with the software client.

8. The method of claim 1 where the goods and services are added to the at least one selected open-ended invoice authorized by a patron associated with said invoice in an ad hoc manner.

9. The method of claim 8 where the addition of goods and services to the at least one selected open-ended invoice results in the addition of a service charge payment associated with goods or services appearing on said invoice.

10. A system of electronic commerce for facilitating electronic payment for ad hoc charges with a plurality of point of sale (POS) systems, comprising:
a computer processor installed within a handheld electronic device possessed by a retail patron;
a communication module for establishing a wireless communication channel from the handheld computer processor to any of a plurality of the plurality of POS associated with one or more retail establishments;
simultaneously initiating, in a software client of the handheld electronic device, a plurality of electronic open-ended invoices for the retail patron with the plurality of POS systems for tracking the goods and services provided to the retail patron on an ad hoc basis via the plurality of POS systems;
coordinating communication via the established wireless communication channel from the handheld computer processor of the retail patron with each POS system of the plurality of POS systems to update, modify, and close any of the electronic open-ended invoices;
in response to the simultaneous initiating each of the plurality of open-ended invoices, setting, in the software client, a preset spending or time limitation for each open-ended invoice of the plurality of open-ended invoices;
determining, at the software client, that at least one of the open-ended invoices have exceeded at least one of the preset spending and the time limit;
in response to the determining, selecting the at least one open-ended invoice found to have exceeded the at least one of the preset spending and the time limit from the plurality of open-ended invoices for closure;
closing automatically, at the software client, the at least one selected open-ended invoice while simultaneously the software client remains active to manage all other of the plurality of open-ended invoices associated with the software client; and
debiting, at the software client, from an account of the retail patron an amount sufficient to pay the charges for the goods and services associated with the selected open-ended invoice upon the closure of the at least one selected open-ended invoice.

11. The system of claim 10 where the software client is in wireless communication with a website associated with a PreGame electronic commerce payment application.

12. The system of claim 11 where the electronic open-ended invoice is an electronic record associated with any Point of Sale system; and
interactions with the electronic open-ended invoice are communicated to the PreGame electronic commerce payment application.

13. The system of claim 12 where interactions with the electronic open-ended invoice include adding charges for goods and services authorized by a patron, modifying the electronic open-ended invoice to subtract or change authorized charges, closing the electronic open-ended invoice to further authorized or unauthorized charges, and adding services charges where authorized by the patron.

14. A system of claim 11 further comprising calculating the value of goods and services associated with entries on the electronic open-ended invoice and providing this amount to the PreGame electronic payment application for payment.

15. The system of claim 10 where the handheld computer processor may be a processor associated with a cell phone, tablet device, laptop computer, smartphone, or other handheld mobile device.

16. The system of claim 10 where the retail establishment is pre-enrolled with a PreGame electronic commerce payment application to accept interactive messages with the software client.

\* \* \* \* \*